United States Patent [19]

Sloane et al.

[11] 4,061,017

[45] Dec. 6, 1977

[54] STRUCTURAL ANALYSIS SYSTEM

[75] Inventors: Edwin A. Sloane, Los Altos; Bruce T. McKeever, Mountain View, both of Calif.

[73] Assignee: Time/Data Corporation, Santa Clara, Calif.

[21] Appl. No.: 631,555

[22] Filed: Nov. 17, 1975

[51] Int. Cl.$^2$ .............................................. G01M 7/00
[52] U.S. Cl. ........................................ 73/579; 73/664; 235/151.3; 364/512; 364/579; 364/724; 364/806; 364/826
[58] Field of Search .............................. 73/67.2, 71.6; 235/150.53, 151, 151.3

[56] References Cited

U.S. PATENT DOCUMENTS

| 3,015,949 | 1/1962 | Arnold | 73/67.2 X |
| 3,654,804 | 4/1972 | Helmuth | 73/71.6 |
| 3,718,813 | 2/1973 | Williams et al. | 235/150.53 X |
| 3,751,994 | 8/1973 | Gross | 73/71.6 X |
| 3,973,112 | 8/1976 | Sloane | 235/151.3 X |

Primary Examiner—James J. Gill
Attorney, Agent, or Firm—Spensley, Horn & Lubitz

[57] ABSTRACT

A system for determining the modal characteristics of a structure in which a plurality of driving signals which have a common preselected frequency and a preselected set of amplitudes and phases corresponding to the estimated parameters of a mode of interest are applied to the structure. The common preselected frequency is in general a complex frequency. The response of the structure to the driving signals are then sensed. Means are provided for receiving the driving signals and the sensed responses, for generating a set of transfer functions characteristic of the structure corresponding to the mode of interest and for obtaining from such set of transfer functions improved estimates of the complex frequencies and complex residues of the mode of interest, that is the damping, frequency, magnitudes and phases of the mode of interest. By varying the preselected frequency and preselected set of amplitudes and phases to correspond to each mode in the structure, all of the modes in the structure and the shapes thereof are determined.

44 Claims, 4 Drawing Figures

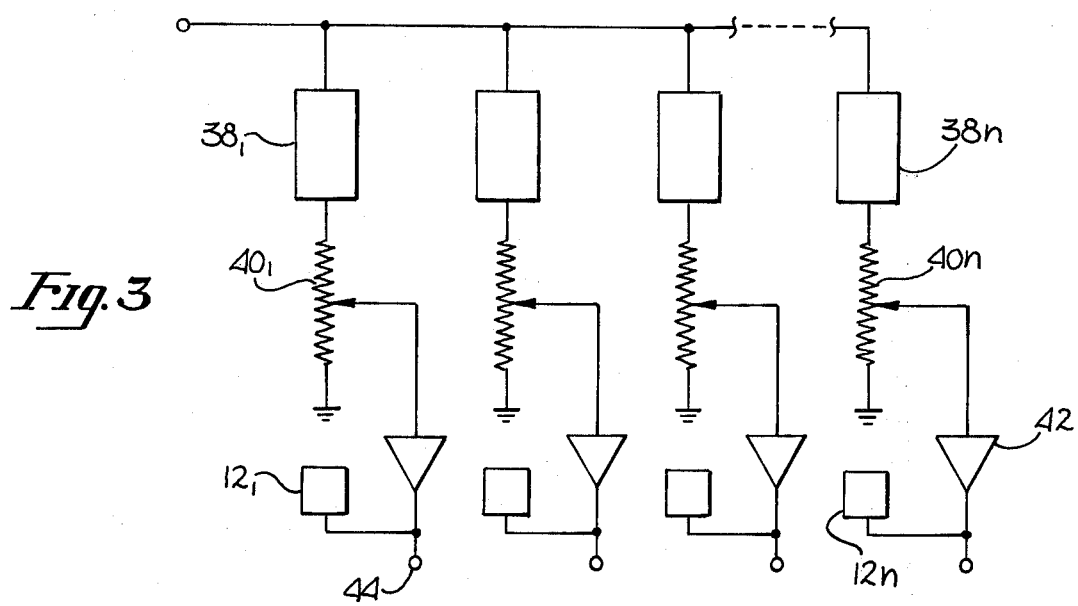
_Fig.3_
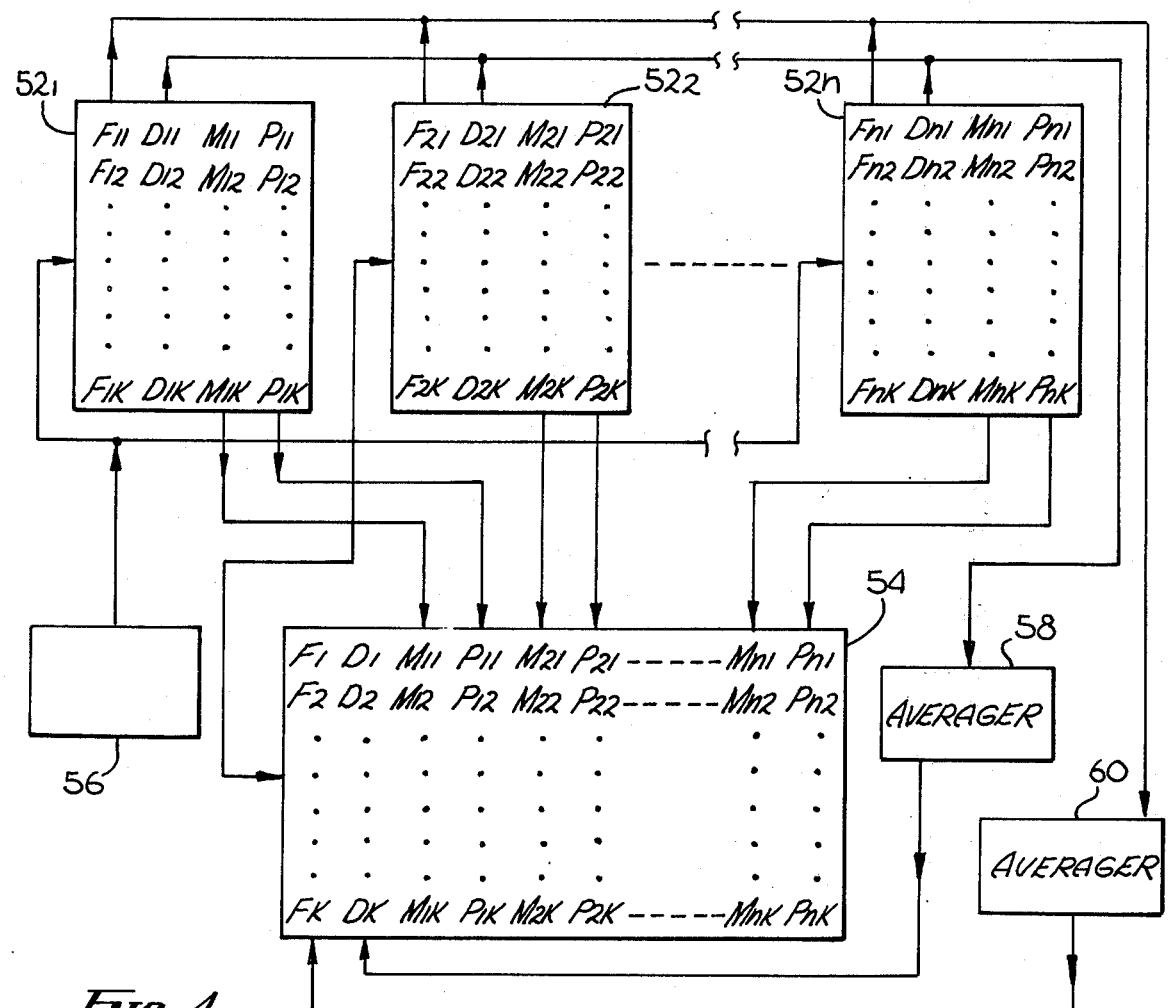
_Fig.4_

STRUCTURAL ANALYSIS SYSTEM

BACKGROUND OF THE INVENTION

1. Field of the Invention

This invention relates to the field of structural analysis and in particular to the determination of the modal characteristics of a structure.

2. Prior Art

One of the key tools in seeking to prevent unstable modes of vibration in a structure which could cause the destruction of the structure is to experimentally determine such modes and eliminate them through, for example, damping or changes in the configuration of the structure. The initial approach to determine such modes, the passive approach, was to excite the structure with a single shaker, record the response which consisted of whatever superposition of natural modes occurred appropriate to the excitation and analyze the recorded response to separate the overlapping modal motions to estimate characteristics of the individual modes. About twenty-eight years ago a significant breakthrough occurred in the experimental determination of modal characteristics using the passive approach. This breakthrough was provided by Kennedy and Pancu, "Use of Vectors in Vibration Measurement and Analyses," Journal Aeronautical Sciences, Vol. 14, No. 11, Nov. 1947, when they suggested that the comparison of the real versus the imaginary parts of frequency response provided far more discrimination than observation of magnitude. Further refinements followed which eventually resulted in a fairly good agreement of theoretical and measure values of mode shape.

While the passive approach had many advantages, it had a serious disadvantage. When the resonant frequencies of vibration of the structure occurred close to each other, the analytic and/or curve fit techniques became more difficult to apply since the modes were allowed to superimpose in arbitrary combination. The end result was the occurrence of large errors in the determination of the individual modes of the structure. Shortly after the Kennedy and Pancu article, a significant breakthrough in the active approach was made by Lewis and Wrisley, "A System for the Excitation of Pure Natural Modes of Complex Structures," Journal Aeronautical Sciences, Vol. 17, No. 11, Nov. 1950, when they suggested a technique which used multiple shakers and tuned the shakers to induce one mode at a time in the structure. In other words, a spatial distribution of forces were to be applied that matched only one mode so that the resulting response of the structure would be entirely due to a desired mode and no other, thus allowing the characteristics of the mode to be measured without interference from other modes. Further refinements in this technique of multiple shaker model testing followed. Traill-Nash, "On the Excitation of Pure Natural Modes in Aircraft Resonance Testing," Journal Aeronautical Sciences, Vol. 25, No. 12, Dec. 1958, showed how to to calculate the required force distribution from the in-phase sinusoidal response to a set of arbitrary but linearly independent applied forces at the resonant frequency. Asher, "A Method of Normal Mode Excitation Utilizing Admittance Measurements," Proc. National Specialist's Meeting on Dynamics and Aeroelasticity, Inst. Aereonautical Sciences, 1958, Ft. Worth, Tex, relaxed the requirement of knowing in advance the number of degrees of freedom and the exact resonant frequency by iteratively determining them, adding one shaker at a time.

Even with the above refinements, however, it has become increasingly more difficult to conduct a good modal analysis of a structure using the Lewis and Wrisley technique. The Lewis and Wrisley technique requires that a distribution of in-phase (except for polarity) forces be adjusted until an in-phase response is produced, the response then being proportional to the desired mode vector, and that the drive frequency then be shifted until there is an overall 90° phase shift between force and response, that frequency then equalling the desired modal natural resonant frequency. It has been discovered, however, that this technique has certain limitations which intrinsically yields inaccuracies in the determination of the mode vectors and the modal natural resonant frequencies of the structure under analysis when nonproportional damping is present in the structure. It can be shown for an undamped system that the resonant frequencies lie exactly on the $j\omega$ axis in the frequency domain and that for an undamped, or proportionally damped system the mode vectors are real, that is the vectors are in-phase except for polarity. For a non-proportionally damped system, however, it can be shown that the natural frequencies are not the same as those in the undamped system since the frequencies are in the s or complex frequency plane and the mode vectors are not real but complex and thus are not in-phase. In addition, it can be shown that if the driving force has the right characteristics, the Lewis and Wrisley test criteria will be satisfied for a nonproportionally damped system but the resonant frequencies will be wrong and the response vector will not be the mode vector of the nonproportionally damped system. Finally, it can be shown that with a single frequency, in-phase drive and response, as used in the Lewis and Wrisley system, it is not possible to excite a pure mode of a nonproportionally damped system.

Accordingly, it is a general object of the present invention to provide an improved structural analysis system.

It is another object of the present invention to provide a structural analysis system which can accurately determine the mode vectors and complex resonant frequencies of a structure.

It is yet another object to provide a structural analysis system which accurately determine the mode vectors and complex resonant frequencies of a structure when nonproportonal damping is present in the structure.

SUMMARY OF THE INVENTION

A system for accurately determining the modal characteristics of a structure is described. The system includes means for applying to the structure a plurality of driving signals which have a common preselected frequency, which in general is a complex frequency, and a preselected set of amplitudes and phases corresponding to the estimated parameters of a mode of interest, and for sensing the response of the structure to the driving signals. Means are then provided for receiving the driving signals and the sensed responses, for generating a set of transfer functions characteristic of the structure corresponding to the mode of interest and for obtaining from such set of transfer functions improved estimates of the complex frequencies and complex residues mode of interest, that is the damping and frequency, and the set of magnitudes and phases of the mode of interest. By varying the preselected frequency and preselected set of amplitudes and phases to correspond to each mode in the structure, all of the modes in the structure and the shapes thereof can be accurately determined.

The novel features which are believed to be characteristic of the invention, both as to its organization and its method of operation, together with further objects and advantages thereof, will be better understood from the following description in connection with the accompanying drawings. It is to be expressly understood, however, that the drawings are for purpose of illustration and description only and are not intended as a definition of the limits of the invention.

BRIEF DESCRIPTION OF THE DRAWINGS

FIG. 3 is a schematic illustration of the controller shown in FIG. 1;

FIG. 4 is a general block diagram of the sorter shown in FIG. 1.

DETAILED DESCRIPTION OF THE INVENTION

A system and method for accurately determining the modal characteristics of a structure is described. The system allows a structure to be subjected to a set of preselected excitations and to estimate from the sensed responses to the excitations the modal characteristics of the structure.

While in the following description a test structure of a mechanical nature, such as an airplane, is subjected to a preselected spatial distribution of forces by utilizing a set of driving signals coupled to a plurality of shakers, it is apparent that various types of excitations, such as, for example, mechanical, hydraulic, acoustical or electrical, may be applied to various types of structures or systems such as, for example, solid structures, hydraulic systems or electrical networks, which would cause such structures to yield responses from which could be obtained the modal characteristics of such structures. The system and method of the present invention should thus be construed to cover such other structures and forms of excitations.

Figure 1:
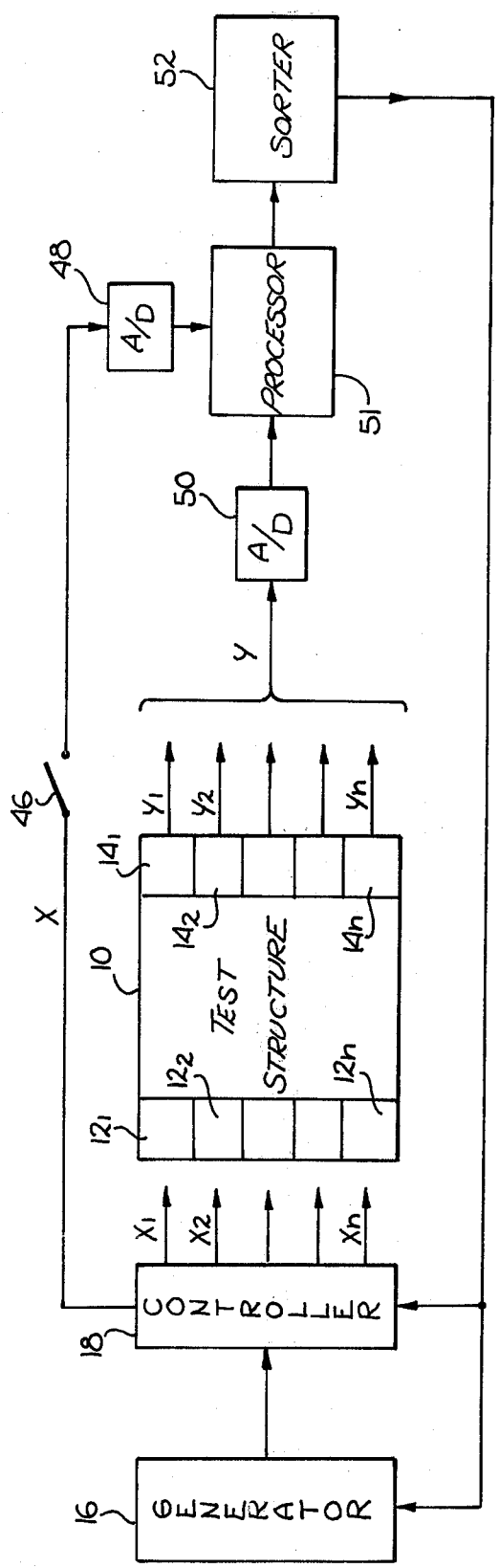
FIG. 1 is a general block diagram used to illustrate the structure and method by which a modal analysis of a structure is accomplished by the present invention.

Referring now to FIG. 1, a test structure 10 has coupled thereto a plurality of shakers $12_1$, $12_2$, ... $12_n$, which are capable of subjecting the structure 10 to a plurality of driving signals. These shakers may take the form of electromagnetic transducers capable of converting driving signals in the form of electrical impulses into mechanical forces. The shakers 12 are placed on the structure 10 at points which are believed to be particularly susceptible to input forces which could cause strong resonant modes of vibration to occur in the structure 10. A plurality of sensors $14_1$, $14_2$ ... $14_n$ are also coupled to the structure 10 in order that the driving signals to which the structure 10 is subjected may be sensed. Commonly known accelerometers or other sensing means may be utilized for the sensors 14 as is known in the art. The driving signals are indicated by the letters $X_1$, $X_2$ ... $X_n$ while the sensed response are indicated by the letters $Y_1$, $Y_2$... $Y_n$. The driving signals X are provided by an exponential generator 16 which is capable of generating a complex frequency signal in the form of a damped sinusoid and a controller 18 which is capable of receiving the signal from the exponential generator 16 and converting it into a plurality of driving signals having a preselected set of amplitudes and phases with respect to one another.

Figure 2:
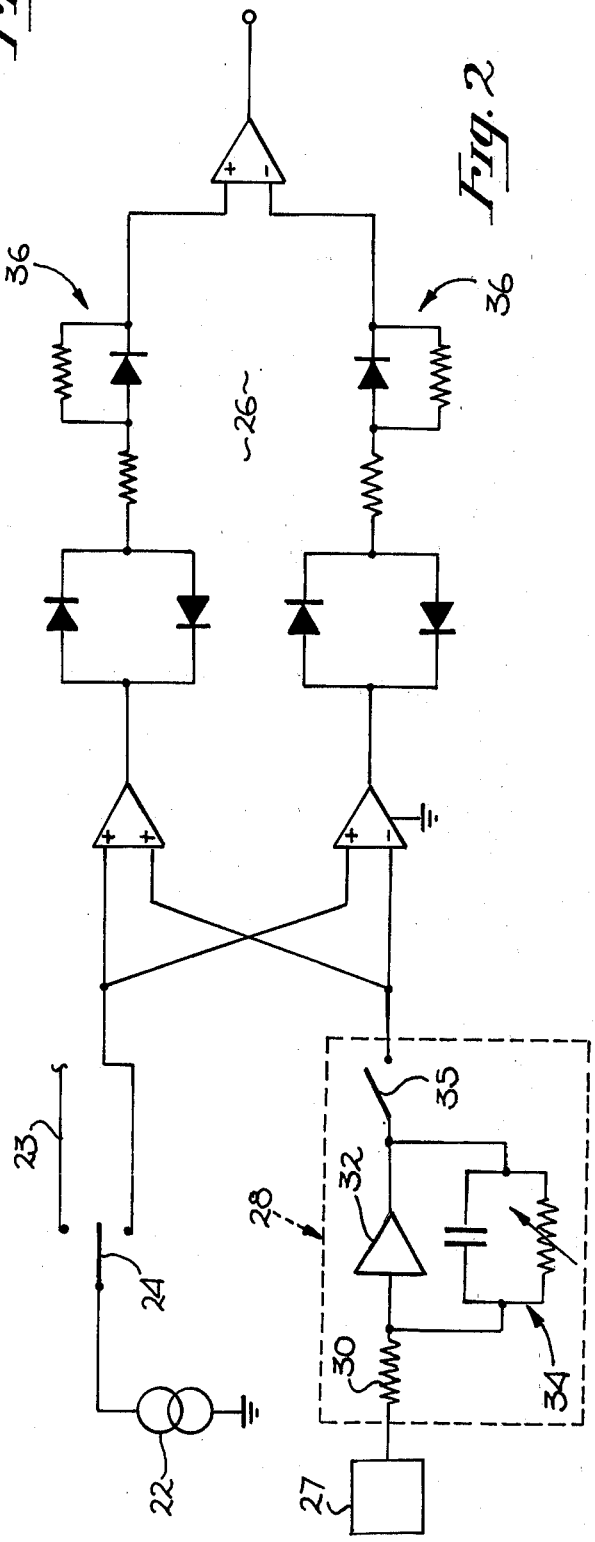
FIG. 2 is a schematic illustration of the generator shown in FIG. 1.

A generator such as shown in FIG. 2 may be used as a source of the complex frequency signal. In FIG. 2 a sine wave oscillator 22, such as a Wien bridge oscillator, i.e. a phase-shift feedback oscillator using a Wien bridge circuit as the frequency determining element, is used to provide a sine wave through switch 24 to a first input of an analog multiplication circuit generally designated by numeral 26. Switch 24 is provided, as will be described hereinafter, in order to provide a swept sine wave directly to one of the shakers 12, the swept sine wave being generated by time varying the values of the RC arms of the Wien bridge oscillator. The second input of the circuit 26 receives an exponentially decaying signal from pulse generator 27 and voltage circuit 28. Circuit 28 comprises a resistor 30 connected to an operational amplifier 32 and an RC feedback circuit 34. At a preselected time, switch 35 is thrown (and then opened at a later time) thereby causing an exponentially decaying voltage with an appropriate time constant to be applied to the second input of the circuit 26. In the circuit 26, generally known as a quarter square multiplier, the sum and difference values of the first and second inputs are applied to resistor-diode circuits 36 whose outputs are one-quarter of the square of the sum and difference values of the inputs, respectively. The outputs of the resistor-diode circuits 36 are then differenced to yield the product of the first and second inputs, a complex frequency signal comprising a sine wave having an exponentially decaying voltage as its envelope. If it is desired to apply merely a sine wave to controller 18, switch 35 can be left in an open position and, as explained hereafter, a sine wave signal having a common frequency and a set of amplitudes and phases, can be applied to the shakers 12. Furthermore, if switch 35 is left closed a series of decaying voltages can be applied to circuit 26 to generate a driving signal X of greater magnitude, as will be more fully described hereinafter.

As stated above, a controller 18 is provided which receives the complex frequency signal from the generator 16 and converts it into a plurality of driving signals having a preselected set of amplitudes and phases with respect to one another. The controller 18 may comprise a plurality of delay lines which are capable of receiving the signal from the generator 16 and delivering it to the various drive lines at appropriate time intervals and a set of conventional variable signal attenuators coupled to each drive line to provide the appropriate amplitudes for the driving signals X. An embodiment of such a controller 18 is illustrated in FIG. 3 in which a plurality of delay lines $38_1$ ... $38_n$ receive the signal from the generator 16 and delay the signal by an amount proportional to the phase angle desired at a given shaker $12_n$ and inversely proportional to the common imaginary part of the complex frequency signal. Another embodiment of delay line 38 may be found on page 949, FIG. 56a, of Radio Engineers' Handbook, by Terman, McGraw Hill Book Company, 1943. The output of each delay line 38 is coupled to a potentiometer $40_n$ set to the relative amplitude desired at each shaker $12_n$. The outputs of the potentiometers $40_n$ are coupled to a plurality of power amplifiers 42 which provide the driving signals $X_1$, $X_2$ ... $X_n$ to the shakers $12_1$, $12_2$, ... $12_n$. While the circuit of FIG. 3 shows the complex frequency signal being applied to all the delay lines 38 simultaneously, it is apparent that a series of switches can be provided that will provide either the complex frequency signal from the generator 16 or the sine wave signal from the oscillator 22 to the delay lines 38 individually or in any desired combination.

As shown in FIG. 1, the driving signals X are coupled through outputs 44 and switch 46 to an analog-to-digital converter 48 and sensed responses Y are coupled to an analog-to-digital converter 50, by which converters the signals X and the responses Y are converted to digital form. The results of the conversion to digital form are then communicated to processor 51 which is capable of calculating the transfer functions of the structure from the information provided by the driving signals X and the sensed responses Y and obtaining from such transfer functions an estimate of the complex frequencies and the complex residues of the modes of the system, the complex frequencies comprising the damping rate and the resonant frequency of each mode and the complex residues comprising the set of magnitudes and phase angles for each mode. The transfer functions of the structure are generally obtained by taking the ratios of the sensed responses Y to the driving signals X to derive a set of multipoint functions, and in the particular instance by taking the ratios of the Laplace transform of the sensed responses Y to the Laplace transform of the driving signals X to generate a transfer function matrix which can be expanded in terms of partial fractions to obtain the complex frequencies and the complex residues of the modes of the system. The equations of such matrix and the expansion thereof are contained in a technical article by E. A. Sloane and B. T. McKeever entitled "Modal Survey Techniques and Theory", published Nov. 17, 1975 at the National Aerospace Engineering and Manufacturing Meeting, Culver City, Los Angeles, Nov. 17–20, 1975, of the Society of Automotive Engineers, which article is incorporated herein by reference.

A system for performing such a Laplace transform and obtaining the desired information is described in patent application Ser. No. 700,446 filed June 28, 1976, now U.S. Pat. No. 4,047,002, entitled Laplace Transform System, by Sloane, Wong and McKeever and assigned to the same assignee as the present invention. Such patent application is a continuation-in-part of patent application Ser. No. 552,665, filed Feb. 24, 1975, now abandoned, which is in turn a continuation of patent application Ser. No. 389,510, filed Aug. 20, 1973, now abandoned. In such patent application, which is incorporated herein by reference, the Laplace transform is performed by first obtaining, in general, the Fourier transform of the response signals (the transform of the impulse input signal being unity) and then performing additional operations to obtain the damping rates, and thus the pole or mode locations in the s-plane or complex frequency plane of the Laplace transforms, and the complex residues, or the magnitudes and phase angles, associated with such poles. A commercially available computer, such as the DEC 11/35 manufactured by Digital Equipment Corporation, using the MAP 51 produced by TIME/DATA CORPORATION, may be used to perform such Laplace Transform to obtain such complex frequencies and complex residues.

The complex frequencies and the complex residues are then sorted by sorter 52 which, by a modal sort routine, groups each pole with the complex residues from each transfer function and calculates from the complex residues the mode vector for each pole. In the case where only a single or well isolated mode is excited, the output of processor 51 will simply provide the desired frequency, damping, magnitude and phase of the excited mode and sorter 52 would not be necessary. In either case, the information from the sorter 52 will be then available to be fed back to the generator 16 and the controller 18. An embodiment of sorter 52 is illustrated in FIG. 4 in which a plurality of digital memories $52_n$ are provided, one for each sensor $14_n$ from which a response $Y_n$ was sensed and for which a transfer function was calculted and expanded in partial fractional form. A location is assigned in each sensor memory to each mode where the modal parameters of frequency ($F_{nk}$), damping ($D_{nk}$), magnitude ($M_{nk}$), and phase ($P_{nk}$) are stored, with n designating a particular sensor and k designating a particular mode. An additional memory 54 is provided to store for each mode location the eigenvalue of the mode ($F_k$, $D_k$) and the complete mode vector or eigenvector ($M_{nk}$, $P_{nk}$) for the mode. A counter 56 successively addresses the memories $52_n$, and for each particular mode location causes the transfer of the eigenvalue of the mode ($F_k$, $D_k$) and mode vector parameters ($M_{nk}$, $P_{nk}$) into the memory 54 at the position corresponding to the eigenvalue ($F_k$, $D_k$) of the mode. While ideally the values of frequency $F_k$ and damping $D_k$ of each mode are identical in each of the memories $52_n$ and the values from any one memory $52_n$ could be transferred to the memory 54, in practice the nature of the structure analyzed generally leads to variations in the measured values of frequency $F_k$ and damping $D_k$. Averagers 58 and 60 are thus provided in the lines from the memories $52_n$ to memory 54 carrying the values of the frequency $F_k$ and damping $D_k$ to obtain a statistical average of the values of such parameters.

A system and method for accurately determining the modal characteristics of a structure has thus been described. If the characteristics of the structure 10 are initially unknown so that no modal estimates can be made, oscillator 22 can be used to provide an initial swept sine signal through switch 24, line 23 and controller 18 to shaker 12 to excite structure 10 and provide a series of sensed responses Y. Alternatively, any broad and band driving signal such as an impulse signal can be used. The sensed responses Y and the swept sine signal are then provided to converters 48 and 50, processor 51 and sorter 52 which generate initial estimates of the complex frequencies and residues of the modes of the structure. This information can then be used to generate, through generator 16 and controller 18, a plurality of driving signals X for a particular mode of interest having a common preselected complex frequency and a preselected set of amplitudes and phases corresponding to such mode of interest to apply to shakers 12 to obtain more accurate values of such mode and its shape. Alternatively, if the common complex frequency and the set of amplitudes and phases for a particular mode were previously estimated, the use of the swept sine signal could be dispensed with and a set of driving signals X having such common complex frequency and set of amplitudes and phases could be initially applied to the structure 10 and the resultant information from the sorter 52 used to update such estimate and provide a more accurate value of the complex frequency and complex residues for the particular mode, and to use such updated information to yield more accurate values for the transfer functions.

While the driving signals X would have in general a common complex frequency, that is a frequency in the s or complex frequency plane, for certain structures, it may be desirable for the driving signals X to have only a common frequency which lies on the $j\omega$ axis in the frequency domain along with the preselected set of amplitudes and phases. In such instances, as stated previously, switch 35 can merely be left open. Furthermore, in those instances where the estimated driving signals X are sufficiently accurate, it may be desirable to merely sense the response of the structure and to determine from, for example, a strip recorder the modal characteristics without calculating the transfer functions of the structure. In such instances, processor 51 need not be utilized.

The information pertaining to the values of the modes and their shape may be used to apply to shakers 12 a plurality of driving signals X to induce a particular pure mode. In such a case, the driving signals X would be initially applied to the shakers 12 and then abruptly terminated by opening switch 24. The ring-out of the structure 10 will then show that mode and that mode alone. Since a pure mode has been induced, switch 46 can be opened and only the sensed responses Y need be provided to converter 50, processor 51 and sorter 52.

While it can be shown that in most cases the application of an initial broadband signal to shaker 121 alone is sufficient to yield enough information to be able to obtain all the transfer functions of the structure, it may be desirable to apply such signal to other shakers to obtain more accurate starting estimates. Finally, if it is desired for test purposes to put more energy into the structure 10 than can be safely provided by the abrupt application of a single damped sinusoid, a series of exponential signals can be used for each of the driving signals $X_n$. The sum of such a series of signals provides a driving signal which has a gradual buildup, a greater energy input at the desired complex frequency and the proper exponential decay or damping rate. Such a driving signal can be generated by leaving switch 35 closed in circuit 28 of FIG. 2. By using a numer of circuits 28 in series, a complex frequency driving signal $X_n$ can be generated, having the energy thereof concentrated in a greater degree at a desired mode of interest.

The system of the present invention thus overcomes the limitations of the Lewis and Wrisley technique by employing a complex frequency (damped sinusoid) generator instead of a sine wave generator and controlling the amplitude and phase of the shakers instead of merely the amplitude and polarity, although, as stated above, for certain structures a sine wave generator may be used with a preselected set of amplitudes and phases. Thus, in the case of damped structures greater modal accuracy can be obtained and unwanted modes can be discriminated against in the analyses of the structure by the use of excitation in the form of a damped sinusoid which acts to concentrate energy in the vicinity of the desired poles and the use of complex mode vectors (which includes phase) which act to decrease correlation between the modes.

Having thus described the invention, it is obvious that numerous modifications and departures may be made by those skilled in the art. If, for example, sufficient information is known about the structure, it may be desirable to apply a complex frequency driving signal with a set of arbitrary amplitudes and phases, or a preselected set of amplitudes with only the polarities of the complex frequency driving signals being varied, that is have all the complex frequency driving signals in-phase except for polarity, or even to have the amplitudes of the complex frequency driving signals substantially the same. In such instances it is apparent that a very simple set of amplitudes and phases may be used. Thus, the invention is to be construed as limited only by the spirit and scope of the appended claims.

What is claimed is:

1. A system for determining the modal characteristics of a structure comprising:

a plurality of shakers coupled to said structure;

means for applying to said shakers a plurality of driving signals having a common preselected complex frequency and a preselected set of amplitudes and phases corresponding to a mode of interest;

means for sensing the response of said structure to said driving signals;

means for receiving said driving signals and said sensed response and for generating a set of transfer functions in the complex frequency domain characteristic of said structure corresponding to said mode of interest, and set of transfer functions containing the complex frequencies and complex residues of said mode of interest; and means for sorting said complex frequencies and said complex residues to obtain a complex frequency and a set of amplitudes and phases corresponding to said mode of interest.

2. The system of claim 1 wherein said common complex frequency and said set of preselected amplitudes and phases are modified in accordance with the information from said sorting means and said plurality of driving signals are reapplied to said shakers to generate a second complex frequency and set of amplitudes and phases corresponding to said mode of interest.

3. The system of claim 1 wherein said driving signal having a preselected complex frequency comprises a damped sinusoid.

4. The system of claim 1 wherein said complex frequency of said driving signals and the individual magnitude and phase of each of said driving signals are selected to induce a substantially pure mode of said structure.

5. The system of claim 1 wherein said means for generating said set of transfer functions includes means for generating the Laplace transform of said sensed response and said driving signals.

6. The system of claim 1 wherein said driving signal comprises a series of exponentially damped sinusoids.

7. The system of claim 1 further comprises means for initially applying a broad band driving signal to a preselected one of said shakers for initially determining the modes characteristic of said structure, each of said modes having a particular complex frequency and a set of amplitudes and phases associated therewith, said receiving and generating means being operable for generating a set of transfer functions in the complex frequency domain characteristic of said structure corresponding to all modes of said structure.

8. The system of claim 1 wherein all modes of said structure are determined by successively applying appropriate pluralities of driving signals to individually induce all said modes.

9. A system for determining the modal characteristics of a structure comprising:

a plurality of shakers coupled to said structure;

means for selectively applying to said shakers a plurality of driving signals having a common preselected complex frequency and a preselected set of amplitudes and phases corresponding to a mode of interest;

means for termininating said driving signals;

means for sensing the response of said structure to said driving signals;

means for receiving said sensed response and for generating a set of transfer functions in the complex frequency domain characteristic of said structure corresponding to said mode of interest, said set of transfer functions containing the complex frequencies and complex residues of said mode of interest; and means for sorting said complex frequencies and said complex residues to obtain a complex frequency and a set of amplitudes and phases corresponding to said mode of interest.

10. The system of claim 9 wherein said common complex frequency and said set of preselected amplitudes and phases are modified in accordance with the information from said sorting means and said plurality of driving signals are reapplied to said shakers to generate a second complex frequency and set of amplitudes and phases corresponding to said mode of interest.

11. The system of claim 9 wherein said means for generating said set of transfer function includes means for generating the Laplace transform of said sensed response.

12. A method of determining the modal characteristics of a structure comprising the steps of:
applying to said structure a plurality of driving signals having a common preselected complex frequency and a preselected set of amplitudes and phases corresponding to a mode of interest;
sensing the response of said structure to said driving signals;
generating from said driving signals and said sensed response a set of transfer functions containing the complex frequencies and complex residues of said modes of interest of said structure; and
sorting said complex frequencies and complex residues to obtain a complex frequency and a set of amplitudes and phases corresponding to said mode of interest.

13. The method of claim 12 comprising the further step of reapplying to said structure a second plurality of driving signals having a common complex frequency and set of amplitudes and phases modified in accordance with the information obtained from said sorting step.

14. The method of claim 12 wherein said step of applying said driving signal includes the step of selecting said complex frequency of said driving signals and the individual magnitude and phase of each of said driving signals to induce a pure mode of said structure.

15. The method of claim 12 comprising the further steps of applying a plurality of driving signals for each individual mode of said structure to induce all said modes.

16. The method of claim 12 wherein said common preselected frequency and said set of amplitudes and phases are obtained by the steps of:
applying to said structure a broadband driving signal;
sensing the response of said structure to said driving signal;
generating from said driving signal and said sensed response a set of transfer functions containing the complex frequencies and comples residues representative of the modes of said structure;
sorting said complex frequencies and complex residues into a set of modes characteristic of said structure, each of said modes having a particular complex frequency and a set of amplitudes and phases; and
selecting a particular complex frequency and set of amplitudes and phases corresponding to a mode of interest for said driving signals.

17. A method of determining the modal characteristics of a structure comprising the steps of:
applying to said structure a plurality of driving signals having a common preselected complex frequency and a preselected set of amplitudes and phases corresponding to a mode of interest;
terminating said driving signals;
sensing the response of said structure to said driving signals;
generating from said sensed response a set of transfer functions containing the complex frequencies and complex residues of said modes of interest of said structure; and
sorting said complex frequencies and complex residues to obtain a complex frequency and a set of amplitudes and phases corresponding to said mode of interest.

18. The method of claim 17 comprising the further step of reapplying to said structure a second plurality of driving signals having a common complex frequency and set of amplitudes and phases modified in accordance with the information obtained from said sorting step.

19. A system for determining the modal characteristics of a structure comprising:
means for utilizing a plurality of driving signals having a common preselected complex frequency and a preselected set of amplitudes and phases corresponding to a mode of interest to apply a preselected spatial distribution of forces to said structure;
means for sensing the response of said structure to said forces;
means for receiving said driving signals and said sensed response and for generating a set of transfer functions in the complex frequency domain characteristic of said structure corresponding to said mode of interest, said set of transfer functions containing the complex frequencies and complex residues of said mode of interest; and
means for sorting said complex frequencies and said complex residues to obtain a complex frequency and set of amplitudes and phases corresponding to said mode of interest.

20. The system of claim 19 wherein said utilizing means comprises a plurality of shakers coupled to said structure.

21. The system of claim 19 wherein said driving signals have substantially the same amplitude, whereby the amplitudes contained in said preselected set are substantially indentical.

22. The system of claim 19 wherein said driving signals are in-phase except for polarity, whereby the phases contained in said preselected set the same except for the polarity thereof.

23. A system for determining the modal characteristics of a structure comprising:
means for utilizing a plurality of driving signals having a common preselected complex frequency and a preselected set of amplitudes and phases corresponding to a mode of interest to apply a preselected spatial distribution of forces to said structure;

means for terminating said forces;

means for sensing the response of said structure to said forces;

means for receiving said sensed response and for generating a set of transfer functions in the complex frequency domain characteristic of said structure corresponding to said mode of interest, said set of transfer functions containing the complex frequencies and said complex residues of said mode of interest; and means for sorting said complex frequencies and said complex residues to obtain a complex frequency and set of amplitudes and phases corresponding to said mode of interest.

24. A system for determining the modal characteristics of a structure comprising:

means for generating a plurality of driving signals having a common preselected complex frequency and a preselected set of amplitudes and phases corresponding to a mode of interest to apply a preselected set of excitations to said structure;

means for applying said excitations to said structure; and means for sensing the response of said structure to said excitations.

25. The system of claim 24 further comprising:

means for receiving said driving signals and said sensed response and for generating a set of transfer functions in the complex frequency domain characteristic of said structure corresponding to said mode of interest, said set of transfer functions containing the complex frequencies and complex residues of said mode of interest.

26. The system of claim 25 further comprising:

means for sorting said complex frequencies and said complex residues to obtain a complex frequency and set of amplitudes and phases corresponding to said mode of interest.

27. The system of claim 24 wherein said means for applying said excitations comprises a plurality of shakers coupled to said structure to apply a preselected spacial distribution of forces to said structure.

28. The system of claim 24 wherein said driving signals have substantially the same amplitude, whereby the amplitudes contained in said preselected set are substantially identical.

29. The system of claim 24 wherein said driving signals are in-phase except for polarity, whereby the phases contained in said preselected set are the same except for the polarity thereof.

30. A system for determining the modal characteristics of a structure comprising:

means for generating a plurality of driving signals having a common preselected complex frequency corresponding to a mode of interest to apply a set of excitations to said structure;

means for applying said excitations to said structure; and means for sensing the response of said structure to said excitations.

31. The system of claim 30 further comprising means for controlling the amplitudes of said driving signals.

32. The system of claim 30 further comprising means for controlling the phases of said driving signals.

33. The system of claim 30 wherein said structure comprises a mechanical structure and said excitations are a set of mechanical forces applied thereto.

34. The system of claim 30 wherein said driving signal having a preselected complex frequency comprises a damped sinusoid.

35. The system of claim 30 wherein said driving signal comprises a series of exponentially damped sinusoids.

36. The system of claim 30 wherein said driving signal has the energy thereof concentrated at said mode of interest.

37. A method of determining the modal characteristics of a structure comprising the steps of:

generating a plurality of driving signals having a common preselected complex frequency and a preselected set of amplitudes and phases corresponding to a mode of interest to apply a preselected set of excitations to such structure;

applying said excitations to said structure; and sensing the response of said structure to said excitations.

38. The method of claim 37 comprising the further step of generating from said driving signals and said sensed response a set transfer functions containing the complex frequencies and complex residues of said mode of interest of said structure.

39. The method of claim 38 comprising the further step of sorting said complex frequencies and complex residues to obtain a complex frequency and a set of amplitudes and phases corresponding to said mode of interest.

40. The method of claim 37 comprising the further step of reapplying to said structure a second plurality of driving signals having a common complex frequency and set of amplitudes and phases modified in accordance with the information obtained from said sensers responses.

41. The method of claim 37 wherein said step of generating said driving signal includes the step of selecting said complex frequency of said driving signals and the individual magnitude and phase of each of said driving signals to induce a pure mode of said structure.

42. The method of claim 37 wherein said structure has a plurality of individual modes of resonance and comprising the further steps of applying a set of excitations for each of said individual modes of resonance of said structure to induce all said modes.

43. A method of determining the modal characteristics of a structure comprising the steps of:

generating a plurality of driving signals having a common preselected complex frequency and a preselected set of amplitudes and phases corresponding to a mode of interest to apply a preselected set of excitations to said structure;

applying said excitations to said structure;

terminating said excitations; and sensing the response of said structure to said excitations.

44. A system for determining the modal characteristics of a structure comprising:

means for generating a plurality of driving signals having a common preselected complex frequency and a preselected set of amplitudes and phases corresponding to a mode of interest to apply a set of excitations to said structure;

means for applying said excitations to said structure;

means for terminating said excitations; and means for sensing the response of said structure to said excitations, the complex frequency of said driving signals and the individual magnitude and phase of each of said driving signals being selected to induce a substantially pure mode of said structure.

* * * * *